(12) United States Patent
Ono et al.

(10) Patent No.: US 9,746,845 B2
(45) Date of Patent: Aug. 29, 2017

(54) SUPPORT DEVICE, RECORDING MEDIUM, AND METHOD FOR FACILITATING DATA EXCHANGE BETWEEN DIFFERENT TYPES OF PROGRRAMMABLE LOGIC CONTROLLERS

(71) Applicant: OMRON CORPORATION, Kyoto (JP)

(72) Inventors: Akio Ono, Shiga (JP); Kenji Uno, Shiga (JP); Yoshihide Nishiyama, Kanagawa (JP); Satoru Miura, Shiga (JP)

(73) Assignee: OMRON CORPORATION, Kyoto (JP)

( * ) Notice: Subject to any disclaimer, the term of this patent is extended or adjusted under 35 U.S.C. 154(b) by 527 days.

(21) Appl. No.: 14/375,930

(22) PCT Filed: Jan. 10, 2013

(86) PCT No.: PCT/JP2013/050285
§ 371 (c)(1),
(2) Date: Jul. 31, 2014

(87) PCT Pub. No.: WO2013/114926
PCT Pub. Date: Aug. 8, 2013

(65) Prior Publication Data
US 2015/0025656 A1    Jan. 22, 2015

(30) Foreign Application Priority Data
Feb. 1, 2012    (JP) .................................. 2012-019785

(51) Int. Cl.
G05B 19/18    (2006.01)
G05B 19/05    (2006.01)

(52) U.S. Cl.
CPC .... G05B 19/052 (2013.01); *G05B 2219/1214* (2013.01)

(58) Field of Classification Search
None
See application file for complete search history.

(56) References Cited

U.S. PATENT DOCUMENTS

| | | |
|---|---|---|
| 6,725,288 B2 | 4/2004 | Nagao et al. |
| 2002/0133240 A1 | 9/2002 | Nagao et al. |

(Continued)

FOREIGN PATENT DOCUMENTS

| | | |
|---|---|---|
| JP | 4-32905 | 2/1992 |
| JP | 2000-138725 | 5/2000 |
| JP | 2002-269024 | 9/2002 |

OTHER PUBLICATIONS

International Search Report, mailed Mar. 26, 2013, in corresponding International Application No. PCT/JP2013/050285.

*Primary Examiner* — Wissam Rashid
(74) *Attorney, Agent, or Firm* — Greenblum & Bernstein, P.L.C.

(57) ABSTRACT

Provided is a support device that supports easier data exchange between PLCs without relying on a type of a PLC of the other communication party. The support device includes: a first input unit for receiving information defining, on a data-by-data basis, variables for data handled by the first programmable logic controller; a second input unit for receiving a source program expressing processing executed on the first programmable logic controller using the defined variables; a third input unit for receiving information that identifies a type of a second programmable logic controller in association with a first variable; and a generation unit that generates the executable program using the information defining the variables and the source program. The generation unit adapts a data structure of first data secured in the (Continued)

memory in correspondence with the first variable in accordance with the type of the second programmable logic controller.

8 Claims, 12 Drawing Sheets

(56) References Cited

U.S. PATENT DOCUMENTS

2008/0133789 A1* 6/2008 McNutt ................ G05B 19/054
  710/30
2011/0270421 A1* 11/2011 Kawamoto ........ G05B 19/4188
  700/17

* cited by examiner

FIG.6

| Data Type | ✕ | | | | | |
|---|---|---|---|---|---|---|
| Structure Type | Name | Data Type | Byte Offset | Bit Offset | Network Publication | Publication Destination |
| Union Type | | | | | | |
| Enumerated Type | | | | | | |
| ▶ StrA | STRUCT | | | Output | 192.168.1.2 | |
| mb | BOOL | 0 | 5 | | | |
| mi | INT | 1 | 0 | | | |

SUPPORT DEVICE, RECORDING MEDIUM, AND METHOD FOR FACILITATING DATA EXCHANGE BETWEEN DIFFERENT TYPES OF PROGRRAMMABLE LOGIC CONTROLLERS

TECHNICAL FIELD

The present invention relates to a support device for supporting the use and management of a programmable logic controller (hereinafter also referred to as a "PLC") used in control of operations of a machine, equipment, and the like, a recording medium having recorded therein a support program for realizing the support device, and a method for generating an executable program using the support device.

RELATED ART

A PLC is typically used as a controller for controlling operations of a machine, equipment, and the like. Such a PLC is versatile and prevalent as it enables a user to freely generate a program in accordance with a machine and equipment targeted for control. According to a conventional PLC, input data, output data, data for internal calculation, and the like are stored at a predetermined location in a storage area. In order to use (refer to) these pieces of data on a program, it is necessary to identify an (absolute or relative) address of the storage area.

In contrast, in consideration of, for example, reusability of programs and the use of shared processing (shared modules) therefor, object-oriented programming is starting to become possible. Specifically, a programming environment that enables the use of (reference to) input data, output data, data for internal calculation, and the like by way of variables is starting to be provided. A program generated in such a programming environment is also referred to as a "variable program" as opposed to a conventional program.

Meanwhile, in order to reduce the device costs of the PLCs themselves, there is a trend toward active employment of general-purpose devices. For example, JP 2002-269024A (Patent Document 1) discloses a PLC that can realize a Plug and Play method, which is technology for general-purpose personal computers.

In connection with the employment of such general-purpose devices, a plurality of manufacturers are progressively establishing alliance and introducing common standards in place of conventional standards specific to individual manufacturers. From a user's point of view, this is advantageous in that a unified system can be constructed without relying on PLC manufacturers. As a typical example of realization of such common standards, common communication standards for connection between PLCs and between a PLC and a field device are starting to be realized.

RELATED ART DOCUMENTS

Patent Documents

Patent Document 1 JP 2002-269024A

SUMMARY OF THE INVENTION

Problem to be Solved by the Invention

However, architectures of PLCs and data structures handled by the same still reflect originalities of manufacturers. That is to say, even with the realization of common communication standards, if data structures and the like of exchanged data are not uniform, there is a possibility that information cannot be appropriately exchanged and originally intended operations cannot be realized.

Meanwhile, it is not easy for a user to generate a program in consideration of a data structure of a PLC of the other communication party.

It is an object of the present invention to provide a support device that supports realization of data exchange between PLCs without relying on a type of a PLC of the other communication party, a recording medium having recorded therein a support program for realizing the support device, and a method for generating an executable program using the support device.

Means for Solving the Problems

A support device according to one aspect of the present invention generates an executable program executed on a first programmable logic controller including a processor, a memory, and a network interface. The support device includes: a first input unit for receiving (accepting) information defining, on a data-by-data basis (i.e. data item by data item), variables for data handled by the first programmable logic controller; a second input unit for receiving (accepting) a source program expressing processing executed on the first programmable logic controller using the defined variables; a third input unit for, when a first variable indicating first data handled by the first programmable logic controller is placed in correspondence, via a network, with a second variable indicating second data handled by a second programmable logic controller that is connected to the first programmable logic controller via the network, receiving (accepting) information that identifies a type of the second programmable logic controller in association with the first variable; and a generation unit that generates the executable program using the information defining the variables and the source program. The generation unit adapts a data structure of the first data secured in the memory in correspondence with the first variable in accordance with the type of the second programmable logic controller.

It is preferable that the information defining the variables includes information defining a data type corresponding to the variables, and the generation unit generates the executable program including an instruction for storing the first data into the memory in accordance with a data structure of the second programmable logic controller corresponding to a first data type.

It is also preferable that the executable program includes an instruction for storing the first data into the memory in such a manner that an order of elements included therein is rearranged.

Alternatively, it is also preferable that the executable program includes an instruction for storing the first data into the memory with a dummy element added thereto.

Alternatively, it is also preferable that the executable program includes an instruction for storing the first data into the memory with a dummy element removed therefrom.

Alternatively, it is also preferable that the executable program includes an instruction for, in response to an output request for the first data stored in the memory, converting the first data into a data structure of the first programmable logic controller corresponding to the first data type and outputting the converted first data.

A support program recorded in a recording medium according to another aspect of the present invention is used to generate an executable program executed on a first programmable logic controller including a processor, a memory, and a network interface. For a computer, the support program includes: a first input instruction for receiving information defining, on a data-by-data basis, variables for data handled by the first programmable logic controller; a second input instruction for receiving a source program expressing processing executed on the first programmable logic controller using the defined variables; a third input unit configured to, when a first variable indicating first data handled by the first programmable logic controller is placed in correspondence, via a network, with a second variable indicating second data handled by a second programmable logic controller that is connected to the first programmable logic controller via the network, receiving information that identifies a type of the second programmable logic controller in association with the first variable; and a generation instruction for generating the executable program using the information defining the variables and the source program. The generation instruction includes an instruction for adapting a data structure of the first data secured in the memory in correspondence with the first variable in accordance with the type of the second programmable logic controller.

According to still another aspect of the present invention, a method is provided for generating an executable program executed on a first programmable logic controller including a processor, a memory, and a network interface using a support device. The method includes: a step of receiving information defining, on a data-by-data basis, variables for data handled by the first programmable logic controller; a step of receiving a source program expressing processing executed on the first programmable logic controller using the defined variables; a step of, when a first variable indicating first data handled by the first programmable logic controller is placed in correspondence, via a network, with a second variable indicating second data handled by a second programmable logic controller that is connected to the first programmable logic controller via the network, receiving information that identifies a type of the second programmable logic controller in association with the first variable; and a step of generating the executable program using the information defining the variables and the source program. The generating step includes a step of adapting a data structure of the first data secured in the memory in correspondence with the first variable in accordance with the type of the second programmable logic controller.

Effects of the Invention

The present invention makes it possible to support realization of data exchange between PLCs without relying on a type of a PLC of the other communication party.

BRIEF DESCRIPTION OF THE DRAWINGS

FIG. 6 shows one example of a user interface that is provided by the support device according to the present embodiment for defining variables.

FIGS. 9(a) (c) are diagrams showing examples of differences in data structures of PLCs in the PLC system according to the present embodiment.

EMBODIMENTS OF THE INVENTION

Figure 1:
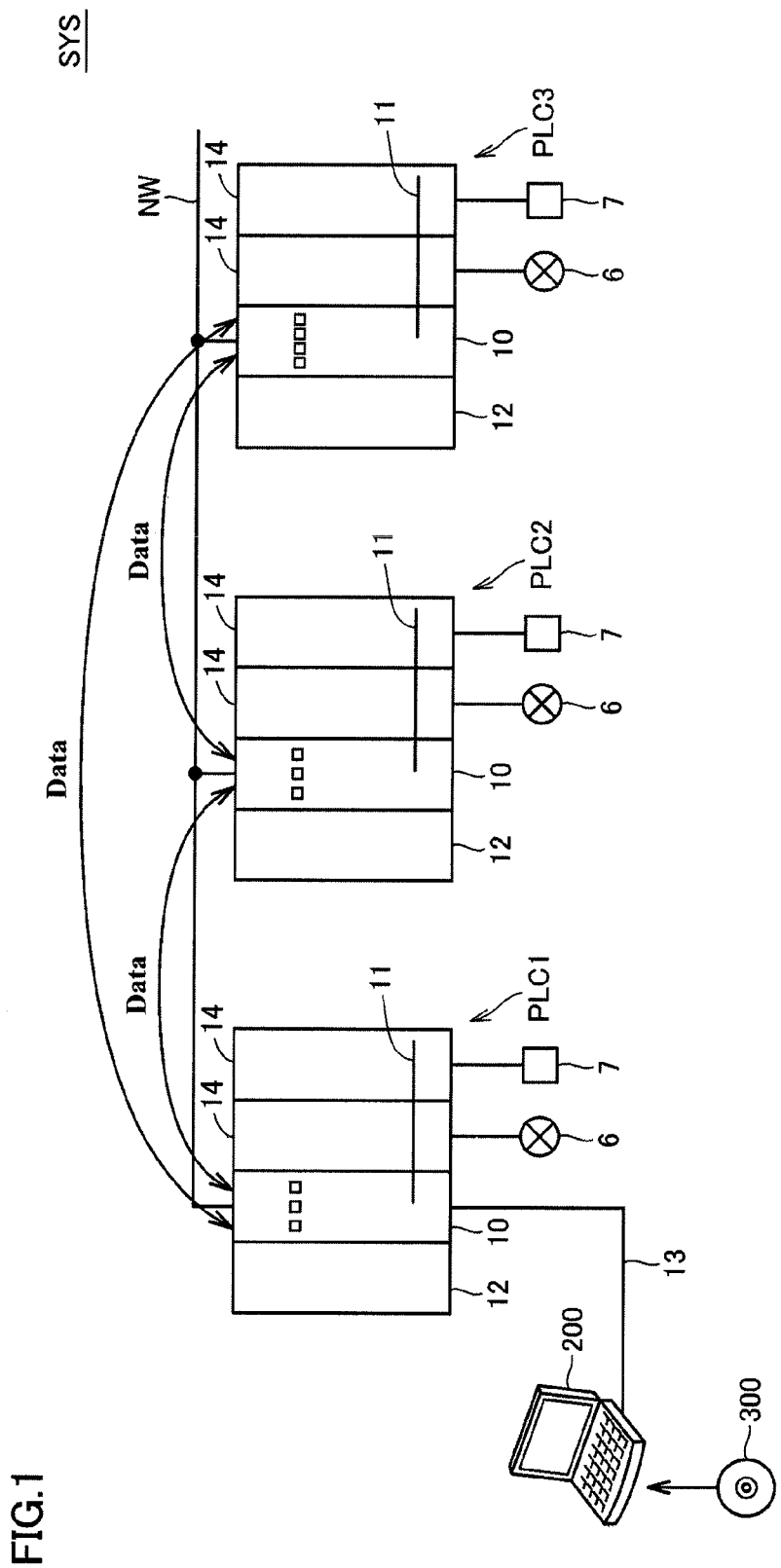
FIG. 1 is a schematic diagram showing a PLC system according to an embodiment of the present invention.

An embodiment of the present invention will now be described in detail with reference to the drawings. It should be noted that elements in the drawings that are identical or equivalent to one another will be given the same reference numerals, and a description thereof will not be repeated.

<A. System Configuration>

First, a description is given of a system including PLCs for which a support device according to the present embodiment supports the use and management.

FIG. 1 is a schematic diagram showing a PLC system SYS according to the embodiment of the present invention. The PLC system SYS according to the present embodiment includes a plurality of PLCs (PLC 1, PLC 2, PLC 3) connected to one another via a network NW. It will be assumed that these PLCs are not necessarily of the same type.

In the present description, "a type of a PLC" mainly involves a viewpoint regarding whether or not data structures that are used (referred to) in a program's processing for, for example, writing, reading and updating data are the same. For example, in a case where data written by one of two PLCs can be interpreted by the other of the two PLCs with the original meaning of the data regardless of a data type, it is assumed that "the PLCs are of the same type". In contrast, in a case where data of a certain data type written by one PLC cannot be interpreted by the other PLC with the original meaning of the data, it is assumed that "the PLCs are not of the same type (that is to say, are of different types)". In other words, in a case where a certain PLC has transmitted data of its own via the network NW, "the type of the PLC" is determined with a focus on whether or not another PLC can receive and accurately interpret the transmitted data.

In the following description, it will be assumed that the PLC 1, PLC 2 and PLC 3 are of different types as a typical example. It will be also assumed that data needs to be exchanged via the network NW between the PLC 1 and PLC 2, between the PLC 2 and PLC 3, and between the PLC 3 and PLC 1. The support device 200 according to the present embodiment adapts data exchange between PLCs under such circumstances.

Each PLC includes a processing unit 10 serving as a main executor of a program, a power source unit 12 that supplies power to the processing unit 10 and the like, and IO (Input/Output) units 14 that exchange signals from fields. The IO units 14 are connected to the processing unit 10 via a system bus 11. Typically, the IO units 14 obtain an input signal from a detection sensor 6 serving as a field device, and drive a relay 7 serving as a field device in accordance with the result of execution of the program by the processing unit 10.

The support device 200 has a function of generating a program executed on a PLC (hereinafter also referred to as an "executable program"), as well as a function of monitoring an operating state, values of various types of data, and the like of a PLC connected thereto. The support device 200 may have a debugging function and a simulation function to support a user to generate the executable program.

<B. Hardware Configuration>

A description is now given of hardware configurations of a PLC and the support device 200 constituting the PLC system SYS shown in FIG. 1.

(b1: Hardware Configuration of PLC)

Figure 2:
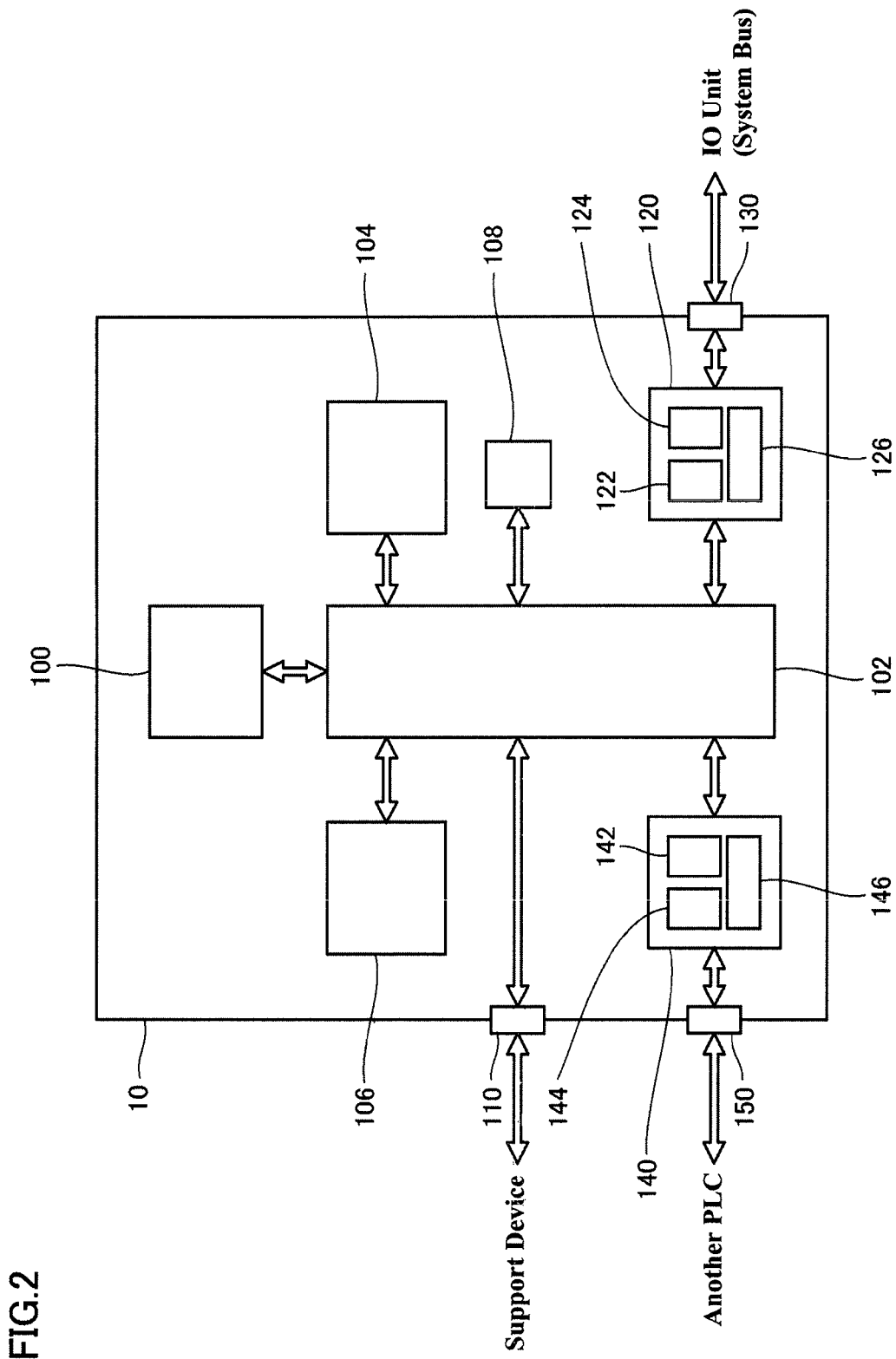
FIG. 2 is a schematic diagram showing a hardware configuration of a processing unit of a PLC according to the present embodiment.

FIG. 2 is a schematic diagram showing a hardware configuration of the processing unit 10 of a PLC according to the present embodiment. Referring to FIG. 2, the processing unit 10 includes a processor 100, a chip set 102, a main memory 104, a non-volatile memory 106, a system timer 108, a system bus controller 120, a network controller 140, and a USB connector 110. The chip set 102 is coupled to other components via various types of buses.

The processor 100 and the chip set 102 are typically configured in compliance with general-purpose computer architectures. That is to say, the processor 100 interprets and executes instruction codes that are sequentially supplied from the chip set 102 in accordance with an internal clock. The chip set 102 exchanges internal data with various types of components connected thereto, and generates the instruction codes necessary for the processor 100. The chip set 102 also has a function of caching, for example, data obtained as a result of execution of computation processing by the processor 100.

The processing unit 10 includes the main memory 104 and the non-volatile memory 106 as memories.

The main memory 104 provides a volatile storage area, and stores various types programs that should be executed on the processor 100 after the power source for the processing unit 10 is switched on. The main memory 104 is also used as a working memory at the time of execution of various types of programs by the processor 100. Devices such as a DRAM (Dynamic Random Access Memory) and an SRAM (Static Random Access Memory) are used as the main memory 104.

The non-volatile memory 106 stores various types of programs (modules) such as a real-time OS (Operating System), a system program and an executable program, as well as data such as system setting parameters, in a non-volatile manner. These programs and data are copied to the main memory 104, where necessary, so that they can be accessed by the processor 100. A semiconductor memory such as a flash memory can be used as the non-volatile memory 106. Alternatively, a magnetic recording medium such as a hard disk drive, an optical recording medium such as a DVD-RAM (Digital Versatile Disk Random Access Memory), and the like can also be used thereas.

The system timer 108 generates an interrupt signal at a constant interval and provides the interrupt signal to the processor 100. Typically, the system timer 108 is configured to generate an interrupt signal in each of a plurality of different intervals in accordance with hardware specifications. The system timer 108 may also be set to generate an interrupt signal at any interval using an OS (Operating System) and a BIOS (Basic Input Output System).

The processing unit 10 includes the system bus controller 120 and the network controller 140 as communication interfaces. These communication interfaces transmit output data and receive input data.

The system bus controller 120 controls data exchange via the system bus 11. More specifically, the system bus controller 120 includes a DMA (Direct Memory Access) control circuit 122, a system bus control circuit 124, and a buffer memory 126. The system bus controller 120 is internally connected to the system bus 11 via a system bus connector 130.

The buffer memory 126 functions as a transmission buffer for data output to the IO units 14 via the system bus 11, and as a reception buffer for data input from the IO units 14 via the system bus 11.

The DMA control circuit 122 transfers output data from the main memory 104 to the buffer memory 126, and transfers input data from the buffer memory 126 to the main memory 104.

With respect to the IO units 14 connected to the system bus 11, the system bus control circuit 124 executes processing for transmitting output data of the buffer memory 126, as well as processing for receiving input data and storing the input data into the buffer memory 126.

The network controller 140 controls data exchange with another PLC via the network NW. That is to say, the network controller 140 controls transmission of output data and reception of input data in accordance with network standards being used. As one example, the present embodiment employs a configuration in which the Ethernet (registered trademark) is used as a physical layer and a data link layer of the OSI reference model, the TCP/IP or UDP/IP is used as a network layer and a transport layer of the OSI reference model, and the CIP (Common Industrial Protocol) is used as a session layer and a presentation layer of the OSI reference model.

Aside from the aforementioned network standards, various types of industrial Ethernet (registered trademark) can be used. Known examples of industrial Ethernet (registered trademark) include EtherCAT (registered trademark), PROFINET (registered trademark), MECHATROLINK (registered trademark)-III, Powerlink, SERCOS (registered trademark)-III, and CIP Motion.

A buffer memory 146 functions as a transmission buffer for data output to another PLC via the network NW, and as a reception buffer for data input from another PLC via the network NW.

A DMA control circuit 142 transfers output data from the main memory 104 to the buffer memory 146, and transfers input data from the buffer memory 146 to the main memory 104.

With respect to another PLC connected to the network NW, a network control circuit 144 executes processing for transmitting output data of the buffer memory 146, and processing for receiving input data and storing the input data into the buffer memory 146. Typically, the network control circuit 144 provides functions of a physical layer and a data link layer in the network NW.

The USB connector 110 is a communication interface for connecting the support device 200 and the processing unit 10. Typically, a program and the like that are transferred from the support device 200 and are executable on the processor 100 of the processing unit 10 are imported into a PLC via the USB connector 110.

(b2: Hardware Configuration of Support Device)

Figure 3:
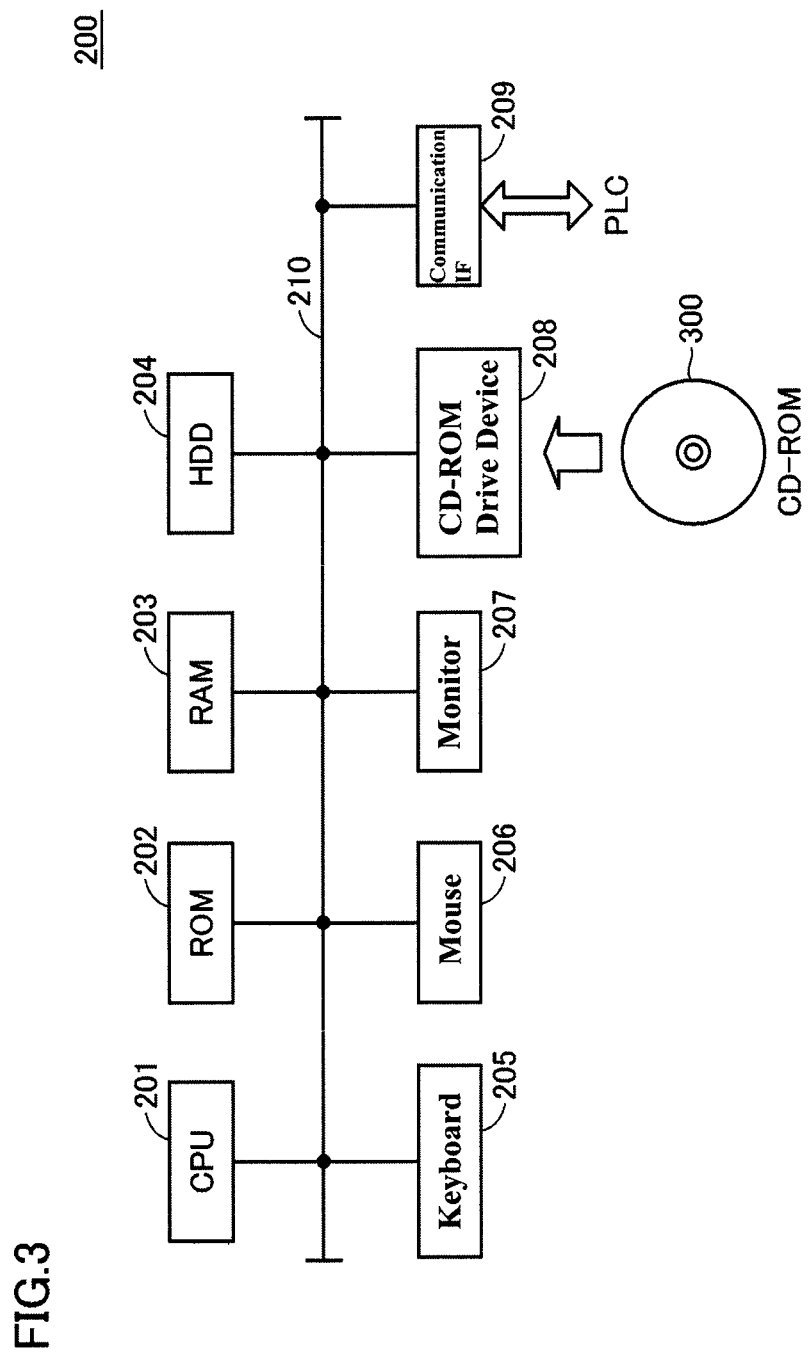
FIG. 3 is a schematic diagram showing a hardware configuration of a support device according to the present embodiment.

FIG. 3 is a schematic diagram showing a hardware configuration of the support device 200 according to the present embodiment. Referring to FIG. 3, the support device 200 is typically constituted by a general-purpose computer. It is preferable that the support device 200 is a notebook personal computer with excellent portability in terms of maintenance.

Referring to FIG. 3, the support device 200 includes a CPU 201 that executes various types of programs including an OS, a ROM (Read Only Memory) 202 that stores a BIOS and various types of data, a memory RAM 203 that provides a working area for storing data necessary for execution of a program by the CPU 201, and a hard disk (HDD) 204 that stores a program and the like executed on the CPU 201 in a non-volatile manner.

The support device 200 also includes a keyboard 205 and a mouse 206 for receiving operations from the user, as well as a monitor 207 for presenting information to the user. The support device 200 includes a communication interface (IF) 209 for communicating with a PLC (processing unit 10) and the like.

As will be described later, various types of programs executed on the support device 200 are distributed while being recorded in a recording medium such as a CD-ROM 300. Programs recorded in this CD-ROM 300 are read by a CD-ROM (Compact Disk-Read Only Memory) drive 208 and stored into the hard disk (HDD) 204 and the like. The recording medium is not limited to the CD-ROM. A known recording medium can be employed. The foregoing configuration in which the recording medium itself is distributed may be replaced with a configuration in which programs are downloaded from, for example, a host computer of a higher level via a network.

<C. Software Configuration>

(c1: Software Configuration of PLC)

A description is now given of a software configuration for a PLC (the processing unit 10) to provide various types of functions.

Figure 4:
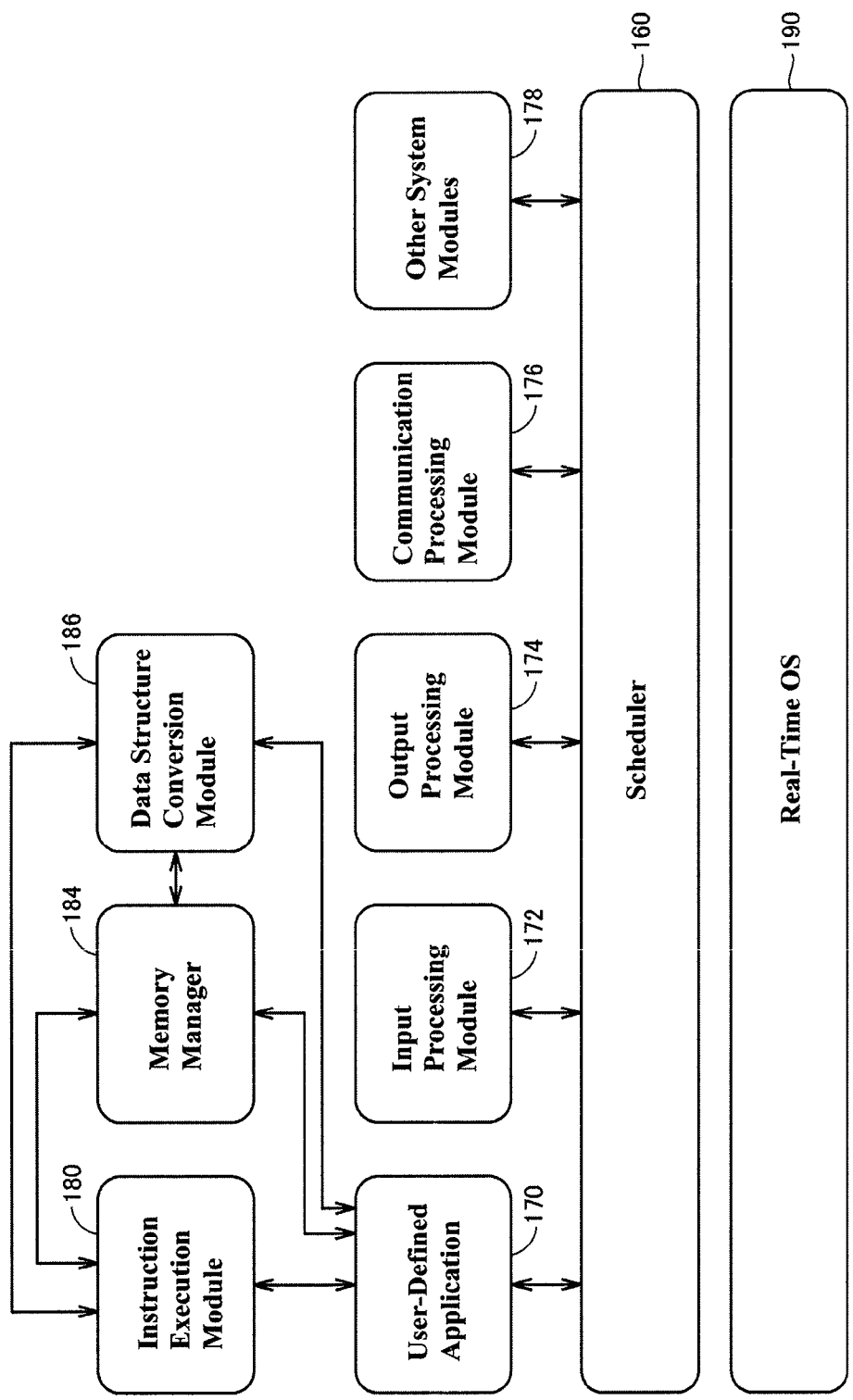
FIG. 4 is a schematic diagram showing a configuration of software provided in the processing unit of a PLC according to the present embodiment.

FIG. 4 is a schematic diagram showing a configuration of software provided in the processing unit 10 of a PLC according to the present embodiment. Instruction codes included in the software shown in FIG. 4 are read at appropriate timings, provided to the processor 100 of the processing unit 10, and executed.

Referring to FIG. 4, programs necessary for processing on the PLC are provided in a real-time OS 190 of the processing unit 10.

The real-time OS 190 is designed in accordance with a computer architecture of the processing unit 10, and provides a basic execution environment in which the processor 100 executes programs necessary for processing on the PLC. More specifically, the real-time OS 190 provides an environment for switching between executions of a plurality of programs over time. Upon the occurrence of an interrupt for a start of a control cycle, the real-time OS 190 switches a target of execution by the processor 100 from a program that is in execution at the time of the occurrence of the interrupt to a scheduler 160.

An executable program according to the present embodiment is basically assumed to be a user-defined application 170. The user-defined application 170 is generated by the support device 200 and transferred from the support device 200 to the processing unit 10. It is permissible to employ a mode in which some modules (or libraries) necessary for the execution of the user-defined application 170 are pre-stored in the processing unit 10, and they are called up and used at appropriate timings (symbolic links). In this case, the support device 200 generates an executable program that does not include some modules. Alternatively, an executable program may include the user-defined application 170 and an instruction execution module 180.

More specifically, the processing unit 10 is provided with the scheduler 160, the user-defined application 170, an input processing module 172, an output processing module 172, a communication processing module 176, other system modules 178, an instruction execution module 180, a memory manager 184, and a data structure conversion module 186.

The scheduler 160 ensures processing in each execution cycle by controlling timings for starting the execution and suspension of processing with respect to the user-defined application 170, the input processing module 172, the output processing module 174, and the communication processing module 176. More specifically, it is often the case that entire processing cannot be completed in one control cycle. In this case, the scheduler 160 distinguishes between processing for which execution should be completed in each control cycle and processing that can be executed over a plurality of control cycles in accordance with, for example, priorities of processing to be executed. That is to say, in each control cycle period, the scheduler 160 executes programs assigned a higher priority at an earlier timing.

The user-defined application 170 is generated by the user in accordance with a purpose of control. That is to say, the user-defined application 170 is a program that is designed at will in accordance with, for example, a line (or a process) targeted for control using the PLC system SYS. More specifically, the user-defined application 170 is generated by compiling source programs expressed in ladder language and the like on the support device 200 and the like. The generated user defined application 170 in a format of an executable (object) program is transferred from the support device 200 to the processing unit 10 via a connection cable 13 and stored into the non-volatile memory 106 and the like.

The user-defined application 170 could possibly include special processing such as sequence processing and motion computation. In coordination with the instruction execution module 180, the user-defined application 170 realizes processing included in the user-defined application 170. More specifically, the user-defined application 170 realizes programmed operations using, for example, instructions and functions provided by the instruction execution module 180.

The instruction execution module 180 is called up when any sequence instruction or any function instruction defined in the user-defined application 170 is to be executed.

The input processing module 172 rearranges input data received by the system bus controller 120 into a format appropriate for use by the user-defined application 170. The output processing module 174 rearranges output data generated by the execution of the user-defined application 170 into a format appropriate for transfer to the system bus controller 120.

The communication processing module 176 controls timings of processing of the network controller 140 for communicating with another PLC. The communication processing module 176 further rearranges input data that the network controller 140 receives from another PLC into a format appropriate for use by the user-defined application 170, and rearranges output data generated by the execution of the user-defined application 170 into a format appropriate for transfer to the network controller 140.

Other system modules 178 collectively represent one or more modules for realizing various types of functions of the PLC 1 other than the programs individually shown in FIG. 4.

The memory manager 184 manages data stored in the main memory 104.

In order to exchange data with another PLC, the data structure conversion module 186 makes a data structure adapted for data structures that are defined for types of PLCs on a type-by-type basis. That is to say, the data structure conversion module 186 converts a data structure of data handled by a PLC in which it is included into a data structure handled by another PLC.

The above-described executable program (the user-defined application 170 by itself, or both of the user-defined application 170 and the instruction execution module 180) is stored in the main memory 104 and/or the non-volatile memory 106 serving as a storage unit.

(c2: Software Configuration of Support Device)

A software configuration of the support device 200 for providing various types of functions will now be described.

Figure 5:
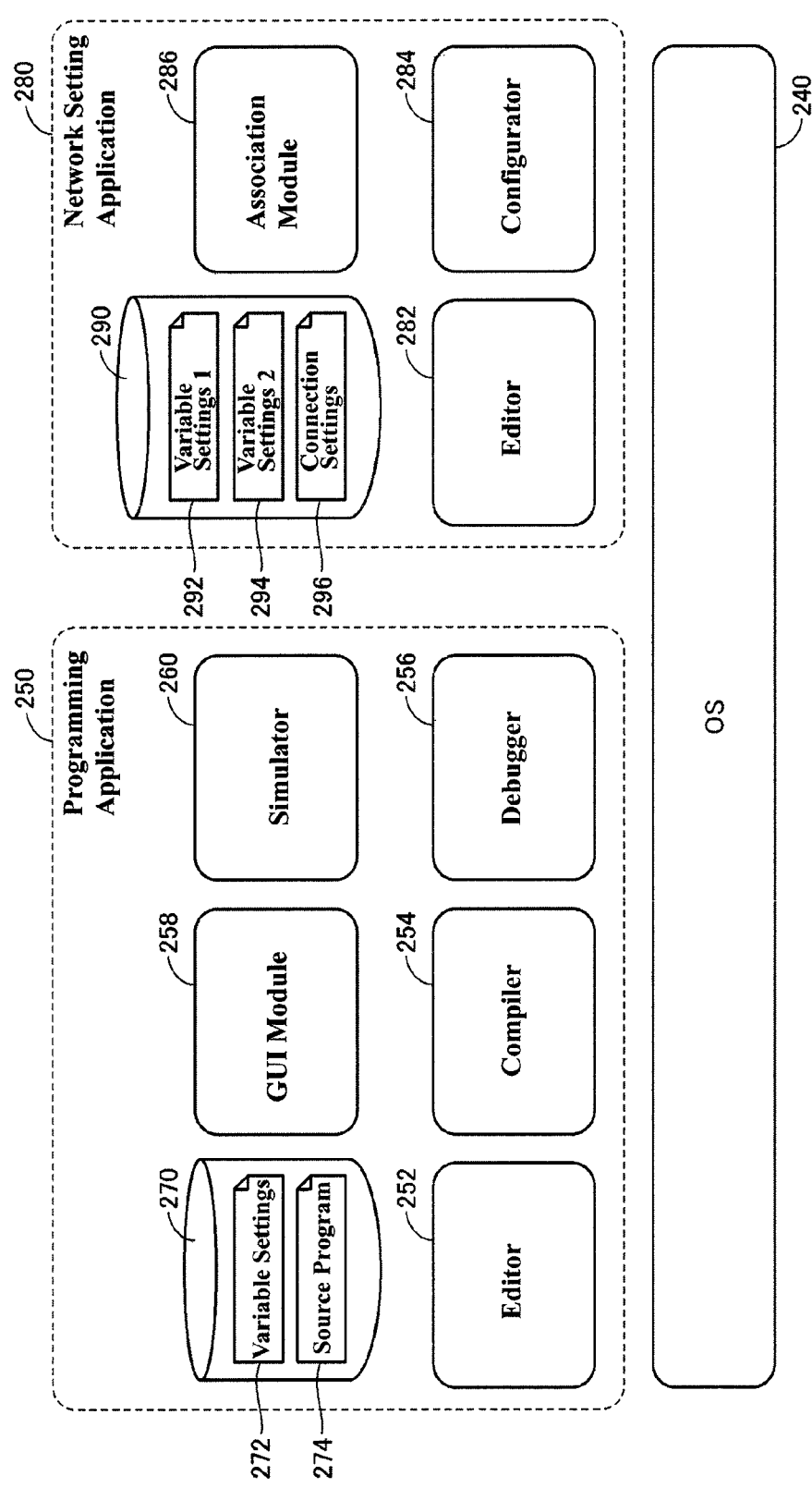
FIG. 5 is a schematic diagram showing a configuration of software provided in the support device according to the present embodiment.

FIG. 5 is a schematic diagram showing a configuration of software provided in the support device 200 according to the present embodiment. Instruction codes included in the software shown in FIG. 5 are read at appropriate timings, provided to the CPU 201 of the support device 200, and executed.

Referring to FIG. 5, the support device 200 is provided with an OS 240, a programming application 250, and a network setting application 280. In the support device 200, the execution of the OS 240 provides an environment in which the programming application 250 and the network setting application 280 are executable. A support program for realizing the support device 200 according to the present embodiment includes at least the programming application 250.

The programming application 250 includes an editor 252, a compiler 254, a debugger 256, a GUI (Graphical User Interface) module 258, a simulator 260, and a data storage unit 270. The modules included in the programming application 250 are typically distributed while being recorded on the CD-ROM 300 and installed in the support device 200.

The editor 252 provides inputting and editing functions for generating a source program 274. More specifically, the editor 252 not only provides a function of generating the source program 274 of the user-defined application 170 in accordance with user's operations on the keyboard 205 and the mouse 206, but also provides functions of storing and editing the generated source program 274.

The compiler 254 provides a function of generating an executable program in a format executable on the processor 100 of the processing unit 10 (or an object format) by compiling the source program 274 of the user-defined application 170.

The debugger 256 provides a function of debugging the source program 274 or the executable program generated from the source program 274. The substance of this debugging includes operations such as partial execution of a range of the source program 274 designated by the user, and tracking of temporal changes in variable values during the execution of the source program 274.

The GUI module 258 has a function of providing a user interface that allows the user to input various types of data and parameters.

The simulator 260 constructs, in the support device 200, an environment for simulating the execution of programs on the processing unit 10 of the PLC 1.

The data storage unit 270 stores the source program 274 generated by the user and variable settings 272 necessary for executing programs.

The network setting application 280 provides a function for configuring the settings related to data exchange between PLCs. The network setting application 280 includes an editor 282, a configurator 284, an association module 286, and a data storage unit 290. The modules included in the network setting application 280 are typically distributed while being stored in the CD-ROM 300 and installed in the support device 200.

The editor 282 provides functions of inputting and editing the setting information of data (variables) exchanged between PLCs. More specifically, the editor 282 not only provides a function of allowing the user to designate variables and the like exchanged between PLCs through operations on the keyboard 205 and the mouse 206, but also provides functions of storing and editing the setting information that has been input. The editor 282 can also obtain (download), from a PLC connected via a network, variable settings and the like of the PLC.

The configurator 284 provides a function of configuring the settings of data exchange between PLCs in a target PLC. Information that is set by this configurator 284 in each PLC is also referred to as connection settings 296.

The association module 286 provides a function of associating target PLCs with each other for data to be exchanged on a data-by-data basis. That is to say, the association module 286 generates the connection settings 296 on a PLC-by-PLC basis.

The data storage unit 290 stores variable settings 292, 294 representing information of variables obtained from a PLC, and the connection settings 296.

<D. Variable Settings>

As described above, a PLC (the processing unit 10) according to the present embodiment includes the processor 100, the main memory 104, the non-volatile memory 106, and the network controller 140 serving as a network interface, and executes an executable program generated by the support device 200. This executable program is a variable program, and is generated by compiling the source program 274 generated by the support device 200. In this source program 274, pieces of data are designated using variables so as to describe a combination of instructions. Therefore, the support device 200 receives (accepts) information that defines variables for data handled by a PLC on a data-by-data basis. More specifically, the user defines variables used by the executable program and data types corresponding to the variables via a user interface provided by the support device 200.

FIG. 6 shows one example of a user interface that is provided by the support device 200 according to the present embodiment for defining variables.

Referring to FIG. 6, a variable defining screen 400, which is a user interface, includes an area 410 for defining variables and data types, and an area 420 for inputting later-described settings of exchange with another PLC via the network NW. In the example shown in FIG. 6, definitions of variables and data types are provided using the same user interface as network settings related to data exchange with another PLC. However, these input modes may be designed in any manner. An input screen corresponding to the area 410 and an input screen corresponding to the area 420 may be provided separately.

More specifically, the area 410 includes a column 412 for inputting a name of a variable, a column 414 for inputting a data type of a corresponding variable, and columns 416 and 418 for inputting a location at which a corresponding variable (element/member) is stored in an aggregate if the data type is the aggregate (that is to say, an array-type variable or a structure variable). That is to say, a start point of data of a corresponding variable is expressed by a combination of bytes (8 bits) and bits, and the number of bytes and the number of bits representing offsets indicating the start point are input to the columns 416 and 418, respectively.

The user can decide a name of a variable input to the column 412 at will.

A data type input to the column 414 is selected from among a plurality of types that have been prepared in advance in accordance with a purpose of use. In the example shown in FIG. 6, "STRUCT" indicating a structure variable is designated in correspondence with a variable "StrA". Furthermore, "BOOL" and "INT" indicating "bit" and "one-word signed binary" are designated in correspondence with variables "mb" and "mi", respectively.

The following are examples of data types that can be designated aside from the one described above: SINT (one-byte signed binary), INT (one-word signed binary), DINT (two-word signed binary), LINT (four-word signed binary), USINT (one-byte unsigned binary), UINT (one-word unsigned binary), UDINT (one-word unsigned binary), ULINT (four-word unsigned binary), REAL (two-word floating point), LREAL (four-word floating point), BYTE (one-byte hexadecimal), WORD (one-word hexadecimal), DWORD (two-word hexadecimal), and LWORD (four-word hexadecimal). It should be noted that not every PLC needs to support all of the foregoing data types, and some may support only a part of the foregoing data types.

The user can generate the source program 274 using the variables defined in the above manner. That is to say, the support device 200 receives the source program 274 that expresses processing executed on a PLC using the defined variables.

<E. Data Exchange via Network>
(e1: Summary)

In the PLC system SYS according to the present embodiment, data can be exchanged between PLCs via the network NW. Target data can be identified using variables also in such data exchange.

The above-described network setting application 280 executed on the support device 200 decides on correspondence relationships between variables indicating data exchanged between PLCs, and sets the decided correspondence relationships in the respective PLCs. That is to say, the connection settings 296 shown in FIG. 5 are decided on and transferred to the respective PLCs.

First, data (variable values) exchanged between PLCs are set in advance as a target of network publication (a network publication attribute is set). Specifically, in FIG. 6 explained above, values such as "output", "input", and "publication only" are set as the network publication attribute in a column 422 included in the area 420. In this way, data (variable values) used inside a PLC can be accessed by another PLC connected via a network. It should be noted only variables used by the executable program as global variables may be set as variables that can be placed in network publication (hereinafter also referred to as "network variables").

Information of a publication destination is also used in identifying a type of a PLC, as will be described later. That is to say the support device 200 receives information that identifies a type of the PLC 2 in association with variables used by the PLC 1.

A column 424 included in the area 420 stores information for identifying a publication destination of a corresponding variable. Typically, an IP address and a MAC address are used as such information for identifying a publication destination. Alternatively, this information may be identification information held in each PLC (inclusive of, for example, model information and manufacturer information).

A name of a variable published on the network NW is also referred to as a "tag", and a function of exchanging data with designation of a name of a variable is also referred to as a "tag communication" function. Furthermore, in place of a variable handled by the executable program executed on a PLC, a variable value as "another name" for exchange on the network NW can be set for the same variable value. A function of thus setting another name is also referred to as "network aliasing". The use of such network aliasing makes it possible to hide internal variables of a PLC from the outside.

Figure 7:
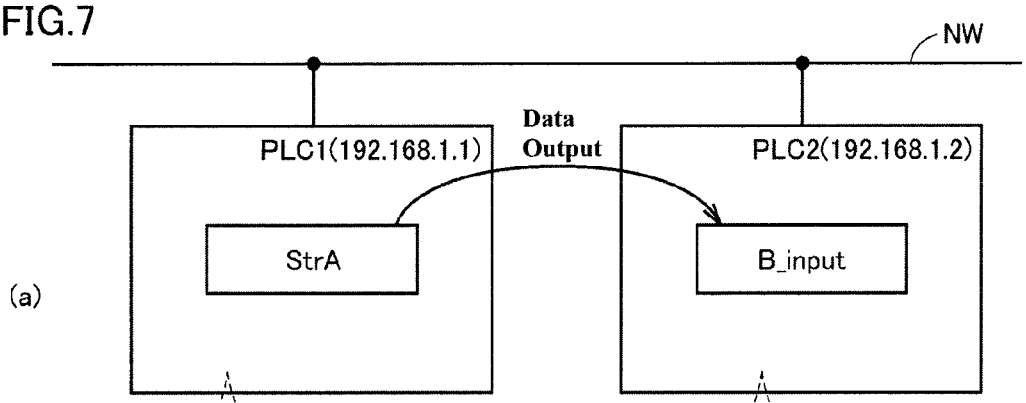
FIGS. 7(a) and (b) are diagrams for illustrating data exchange via a network in the PLC system according to the present embodiment.
Figure 7:
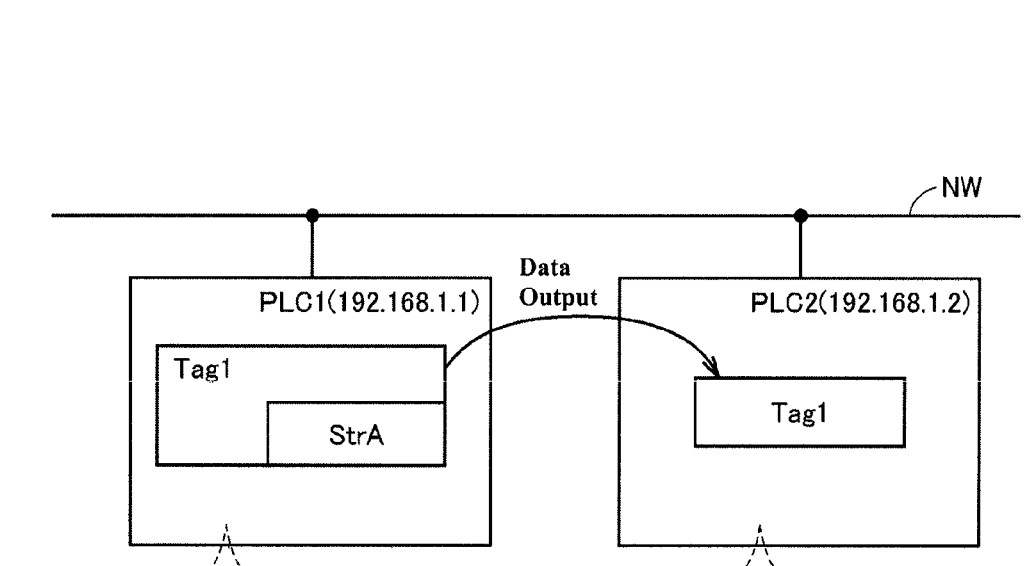

FIG. 7 is a diagram for illustrating data exchange via a network in the PLC system SYS according to the present embodiment. More specifically, FIG. 7(a) shows processing for a case in which an internal variable of a PLC is used as-is as a network variable, whereas FIG. 7(b) shows processing for a case in which network aliasing has been set.

Referring to FIG. 7(a), in the PLC 1, an internal variable "StrA" is defined, and a network publication attribute and a publication destination (in the present example, the PLC 2) are set in correspondence with the internal variable "StrA". On the other hand, in the PLC 2, an internal variable "B_input" is defined in correspondence with data received via the network NW, and a network publication attribute is set in correspondence with the internal variable "B_input". It will be assumed that correspondence relationships with the internal variable "StrA" and with the internal variable "B_input" are set in the PLC 1 and PLC 2. A method for setting these correspondence relationships will be described later.

By thus setting the variable definitions and network attributes, a value (data) that is sequentially updated in the PLC 1 and stored in the internal variable "StrA" can be used for internal processing in the PLC 2 as its internal variable "B_input".

FIG. 7(b) shows an example in which the internal variable "StrA" of the PLC 1 is placed in network publication as a network variable "Tag1". In this case, in a network variable table for defining the network variable, correspondence between the internal variable "StrA" and the network variable "Tag1" is defined, and a corresponding network publication attribute (in the present example, "output") is set. In the PLC 2, a value (data) stored in the internal variable "StrA" of the PLC 1 can be used for internal processing by designating the network variable "Tag1" on the network NW.

(e2: Settings)

The following describes settings of correspondence relationships (name resolution) necessary for the above-described data exchange between PLCs.

Figure 8:
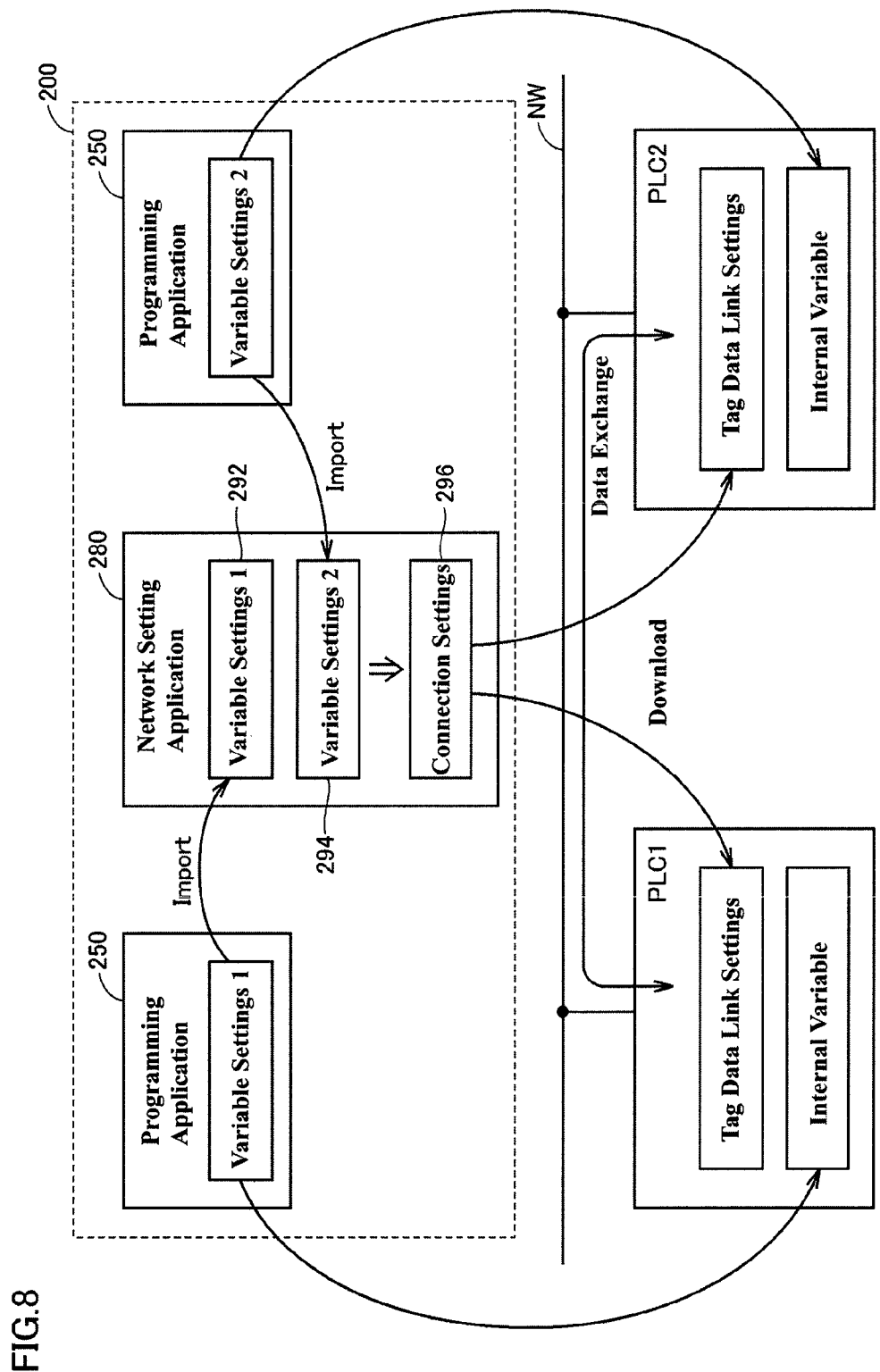
FIG. 8 is a diagram for illustrating a method for setting correspondence relationships necessary for exchanging data between PLCs in the PLC system according to the present embodiment.

FIG. 8 is a diagram for illustrating a method for setting correspondence relationships necessary for exchanging data between PLCs in the PLC system SYS according to the present embodiment. It will be assumed that programming applications 250 executed on the support device 200 hold variable settings 1 and variable settings 2 that define variables used in the PLC 1 and the PLC 2, respectively. The network setting application 280 decides on correspondence relationships between variables by comparing the variable settings 1 (variable settings 292) and the variable settings 2 (variable settings 294) of the respective PLCs, and generates the connection settings 296 reflecting the decided correspondence relationships.

For the sake of convenience, FIG. 8 shows an example in which two programming applications 250 are executed on a single support device 200. If the support device 200 is prepared on a PLC-by-PLC basis, a programming application 250 is executed on each support device 200. In this case, the variable settings of the respective PLCs are output (imported) to the network setting application 280 using a known method.

Then, based on the generated connection settings 296, the network setting application 280 causes tag data link settings, which define correspondence relationships between internal variables and network variables, to be output to (downloaded to) both of the PLC 1 and PLC 2.

The PLC 1 and PLC 2 can exchange data with another PLC by configuring a network in accordance with the tag data link settings received from the network setting application 280. It should be noted that the tag data link settings include a tag (variable/name of variable), a tag set (correspondence relationships between tags), connection settings, and the like.

In this way, the support device 200 receives correspondence relationships for placing variables (tags) indicating data handled by the PLC 1 in correspondence with variables (tags) indicating data handled by the PLC 2, which is connected to the PLC 1 via the network NW, via the network NW. Based on the correspondence relationships, the support device 200 sets a network for the respective PLCs that exchange data.

<F. Differences in Data Structures>

Assume a mode in which target data is transmitted to another PLC as-is, that is to say, as data that is internally handled by each PLC, in the course of the above-described data exchange via the network NW. That is to say, internal memory data of a PLC itself is passed to another PLC. In this case, data may not be appropriately exchanged due to differences in data structures (data formats) handled by PLCs. Such differences in data structures are exemplarily shown in FIG. 9.

Figure 9:
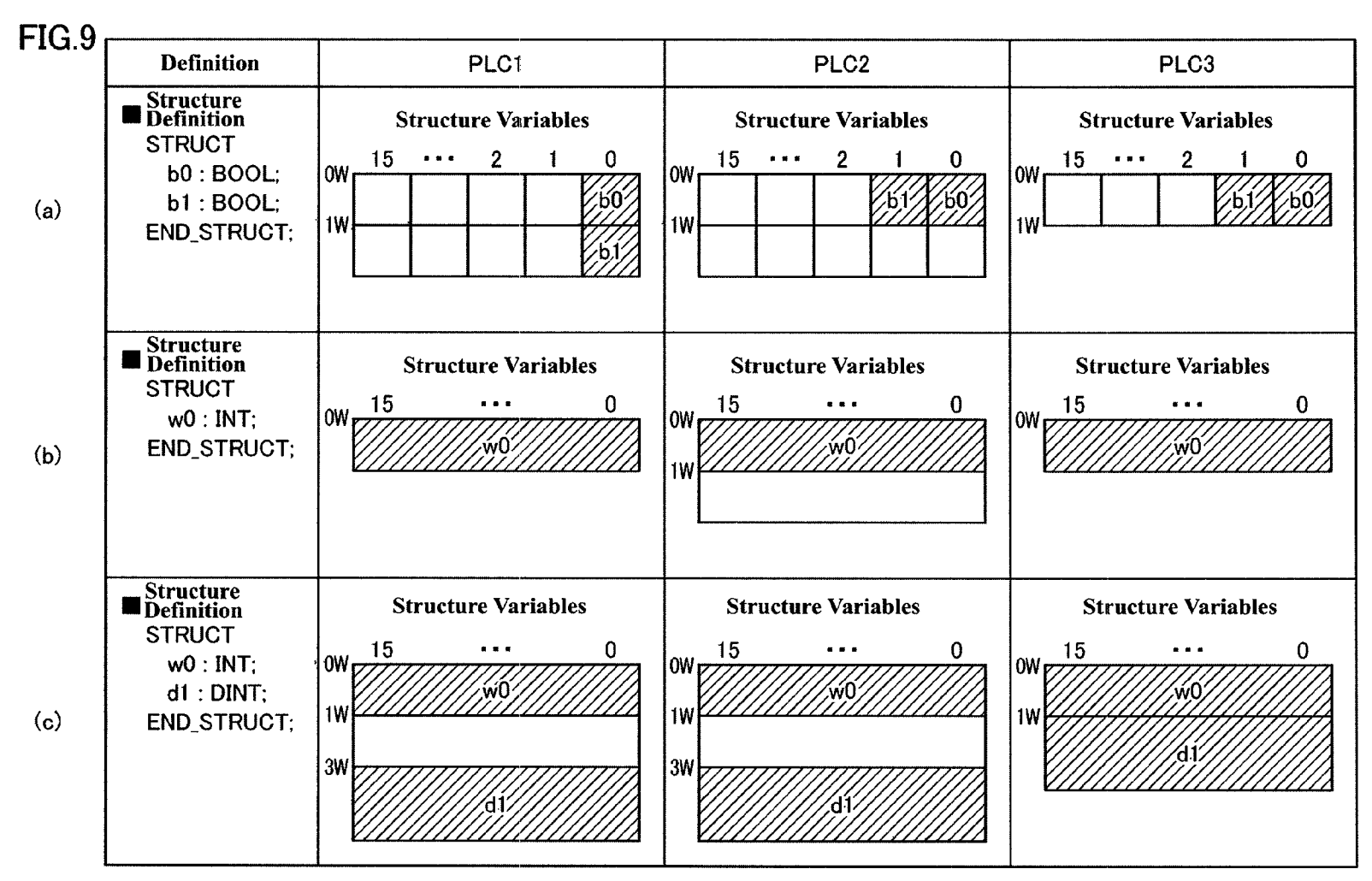

FIG. 9 shows examples of differences in data structures of PLCs in the PLC system SYS according to the present embodiment. While FIG. 9 shows examples of an aggregate data type, no limitation is intended in this respect. There could be a wide variety of differences in data structures. As will be described later, the support device 200 according to the present embodiment generates an executable program in which such differences in data structures have been adapted.

FIG. 9(a) shows an example in which structure variables are defined, and a variable b0 and a variable b1, which are BOOL (bit), are defined as members thereof. For example, it will be assumed that, in the PLC 1, a two-word area is secured as structure variables thereof, a value of the variable b0 is stored in the least significant bit of the first word, and a value of the variable b1 is stored in the least significant bit of the second word.

On the other hand, it will be assumed that internal memory data of the PLC 2 and PLC 3 has a different format, even though similar structure variables are defined. For example, it will be assumed that, in the PLC 2, a two-word area is secured as structure variables thereof, a value of the variable b0 is stored in the least significant bit of the first word, and a value of the variable b1 is stored in a bit next to the least significant bit. It will be also assumed that, in the PLC 3, a one-word area is secured as structure variables thereof, a value of the variable b0 is stored in the least significant bit, and a value of the variable b1 is stored in a bit next to the least significant bit.

FIG. 9(b) shows an example in which structure variables are defined, and a variable w0 representing INT (one-word signed binary) is defined as a member thereof. For example, it will be assumed that, in the PLC 1, a one-word area is secured as structure variables thereof, and a data value (one word) of the variable w0 is stored in its entirety. The PLC 3 also employs a similar data structure.

On the other hand, it will be assumed that, in the PLC 2, a two-word area is secured as structure variables thereof, a data value (one word) of the variable w0 is stored in the first word, and the second word is null (or dummy data).

FIG. 9(c) shows an example in which structure variables are defined, and a variable w0 representing INT (one-word signed binary) and a variable d1 representing DINT (two-word signed binary) are defined as members thereof. For example, it will be assumed that, in the PLC 1, a four-word area is secured as structure variables thereof, a data value (one word) of the variable w0 is stored in the first word, the second word is null, and a data value (two words) of the variable d1 is stored in the third and fourth words. The PLC 2 also employs a similar data structure.

On the other hand, it will be assumed that, in the PLC 3, a three-word area is secured as structure variables thereof, a data value (one word) of the variable w0 is stored in the first word, and a data value (two words) of the variable d1 is stored in the second and third words.

As described above, in the PLC 1, PLC 2 and PLC 3, some data types have a common data structure, and other data types have different data structures.

<G. Adaptation Processing for Data Structure>

As described above, the processing unit 10 of a PLC according to the present embodiment has a function of reading/writing network variables by designating tag names. The processing unit 10 (the communication processing module 176 of FIG. 4) has a function of preventing data values from being written into an unintended data type by checking a data type and a check bit (in the case of structure variables, a Cyclic Redundancy Check or CRC) of variables when writing the data values into the variables. It should be noted that a CRC of structure variables is dynamically calculated based on information of a data type of the structure variables. The processing unit 10 (the communication processing module 176 of FIG. 4) also performs a CRC check for a received message.

As described above, when data is exchanged between PLCs, internal variables of PLCs are transmitted as-is as network variables. Therefore, if PLCs have different data structures, error occurs in the aforementioned check of a data type and a CRC. Furthermore, due to different data structures, originally intended data cannot be exchanged between PLCs.

In view of this, the support device 200 according to the present embodiment generates an executable program that enables data exchange between any PLCs by absorbing the above-described differences in data structures (that is to say, data alignments) without user's awareness. The following discusses a mode in which the PLC 2 and PLC 3 execute processing using data structures specific to themselves as-is, and the PLC 1 is adapted for the PLC 2 and PLC 3. It should be noted that any PLC may be adapted.

Figure 10:
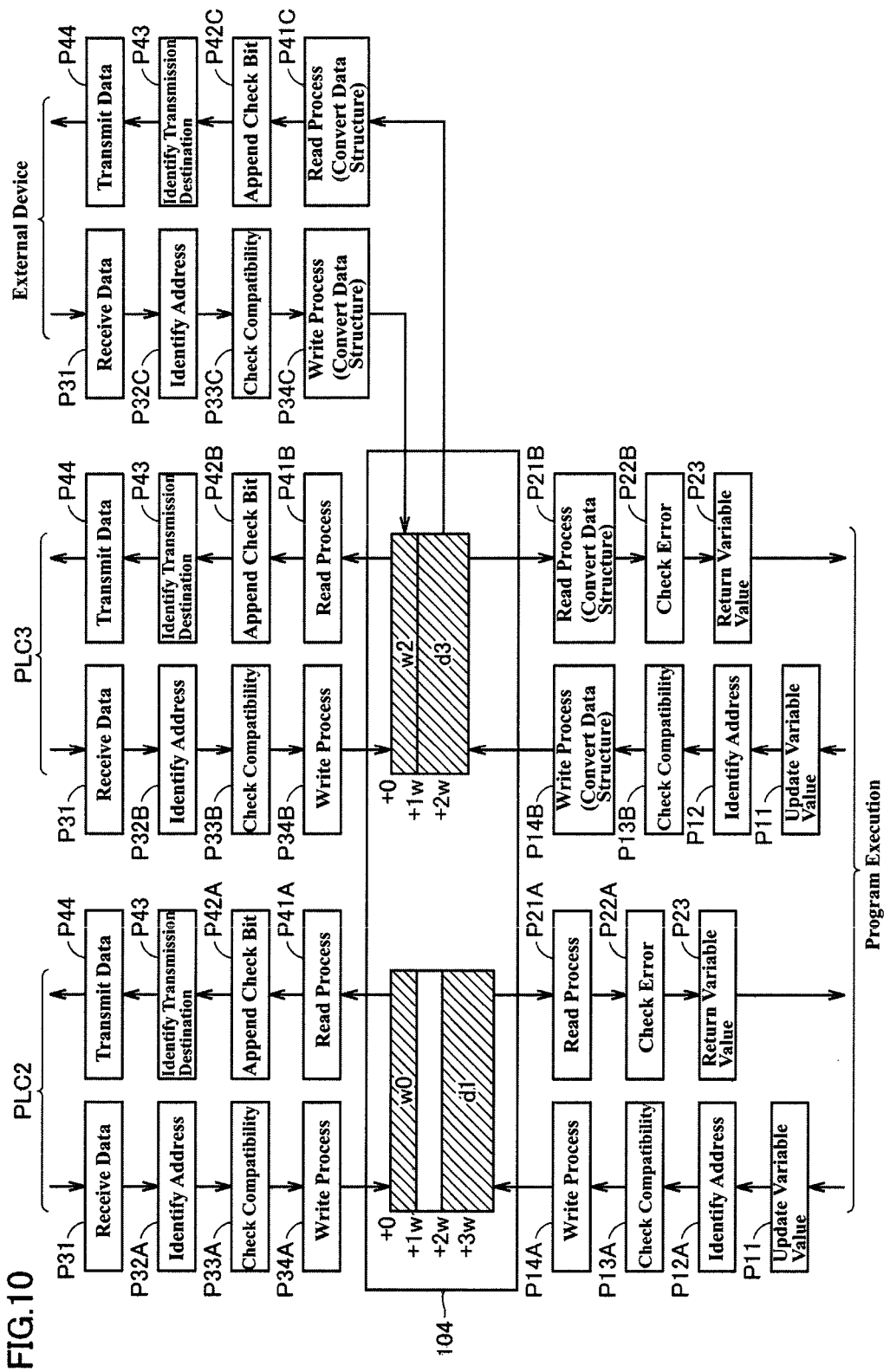
FIG. 10 is a diagram for illustrating processing of a PLC executed by an executable program generated by the support device according to the present embodiment.

FIG. 10 is a diagram for illustrating processing of the PLC 1 executed by an executable program generated by the support device 200 according to the present embodiment. FIG. 10 shows an example of processing for a case in which variables with a data structure shown in FIG. 9(c) are exchanged between the PLC 1 and PLC 2, and between the PLC 1 and PLC 3. It will be assumed that, as shown in FIG. 9(c), the PLC 1 and PLC 2 use the same data structure, but the PLC 1 and PLC 3 use different data structures.

(1: Between PLC 1 and PLC 2)

First, variables (structure variables) exchanged between the PLC 1 and PLC 2 will be described. In this case, normal processing is executed as there is no need to take differences in data structures into consideration.

More specifically, when a target variable value is updated through the execution of the executable program on the PLC 1 (process P11), the processor 100 of the processing unit 10 identifies an address on a memory (typically, the main memory 104) in which the updated variable value is stored (process P12A). Then, after performing a compatibility check (process P13A), the processor 100 writes the updated value into a designated address on the memory (process P14A).

When any variable value is requested through the execution of the executable program on the PLC 1, the processor 100 of the processing unit 10 reads data (the variable value) stored in the memory (process P21A), performs an error check based on a CRC of the read data and the like (process P22A), and then returns the variable value (process P23).

Upon receiving data (a variable value) of a network variable from the PLC 2 (process P31), the processor 100 of the processing unit 10 identifies an address on a memory (typically, the main memory 104) into which the received variable value should be stored (process P32A). Then, after performing a compatibility check (process P33A), the processor 100 writes the updated value into a designated address on the memory (process P34A).

When the PLC 2 requests data (a variable value) of a network variable, the processor 100 of the processing unit 10 reads the data (the variable value) stored in the memory (process P41A), and appends a check bit to a CRC of the read data and the like (process P42A). Then, the processor 100 identifies a transmission destination of the requested data (variable value) (process P43), and transmits the variable value (process P44).

(2: Between PLC 1 and PLC 3)

On the other hand, the following procedure is taken when data is exchanged with the PLC 3 with a different data structure.

When a target variable value is updated through the execution of the executable program on the PLC 1 (process P11), the processor 100 of the processing unit 10 identifies an address on a memory (typically, the main memory 104) in which the updated variable value is stored (process P12B). At this time, data is stored into the memory in accordance with a data structure handled by the PLC 3. Therefore, the address is identified using a calculation method corresponding to the data structure handled by the PLC 3, rather than a calculation method corresponding to a data structure handled by the PLC 1. Then, the processor 100 performs a compatibility check (process P13B). This compatibility check is also performed using a calculation method corresponding to the data structure handled by the PLC 3. The processor 100 further writes the updated value into a designated address on the memory (process P14B). At this time, the processor 100 writes data into the memory in accordance with a data structure corresponding to the data structure handled by the PLC 3. That is to say, a data structure is converted. In this way, the executable program executed on the PLC 1 includes an instruction for storing target data (a variable value) into the memory in accordance with a data structure of another PLC corresponding to a target data type of the PLC 1.

When any variable value is requested through the execution of the executable program on the PLC 1, the processor 100 of the processing unit 10 reads data (a variable value) stored in the memory (process P21B), and performs an error check based on a CRC of the read data and the like (process P22B). In reading the data (variable value), conversion to the data structure handled by the PLC 1 is performed. This error check is also performed using a calculation method corresponding to the data structure handled by the PLC 3. The processor 100 then returns the variable value (process P23).

Upon receiving data (a variable value) of a network variable from the PLC 3 (process P31), the processor 100 of the processing unit 10 identifies an address on a memory (typically, the main memory 104) into which the received variable value should be stored (process P32B). At this time, the address is identified using a calculation method corresponding to the data structure handled by the PLC 3, rather than a calculation method corresponding to the data structure handled by the PLC 1. Then, the processor 100 performs a compatibility check (process P33B). This compatibility check is also performed using a calculation method corresponding to the data structure handled by the PLC 3. The processor 100 further writes the updated value into a designated address on the memory (process P34B).

When the PLC 3 requests data (a variable value) of a network variable, the processor 100 of the processing unit 10 reads the data (variable value) stored in the memory (process P41B), and appends a check bit to a CRC of the read data and the like (process P42B). The reading and error check for the data (variable value) are also performed using a calculation method corresponding to the data structure handled by the PLC 3. Then, the processor 100 identifies a transmission destination of the requested data (variable value) (process P43), and transmits the variable value (process P44).

As described above, the executable program executed on the PLC 1 includes an instruction for storing target data (a variable value) into the memory in accordance with a data structure of another PLC corresponding to a target data type of the PLC 1. The following are examples of such an instruction for storing target data (a variable value) into the memory in accordance with a data structure.

(a) An instruction for storing into the memory in such a manner that the order of elements (members) included in data (a variable value) handled by the PLC 1 is rearranged (applied to, for example, the data structure shown in FIG. 9(a)).

(b) An instruction for storing into the memory with a dummy element added to data (a variable value) handled by the PLC 1 (applied to, for example, the data structures shown in FIGS. 9(b) and 9(c)).

(c) An instruction for storing into the memory with a dummy element removed from data (a variable value) handled by the PLC 1 (applied to, for example, the data structures shown in FIGS. 9(b) and 9(c)).

If an external device (for example, a personal computer and a display device) and the like are connected to the PLC 1, it is basically preferable that data (a variable value) with a data structure handled by the PLC 1 is output. It is hence preferable that data (a variable value) stored in a data structure different from the data structure handled by the PLC 1 is output to the external device in its original data structure. Processing for this case is also shown in FIG. 10.

Upon receiving data (a variable value) of a network variable from the external device (process P31), the processor 100 of the processing unit 10 identifies an address on a memory (typically, the main memory 104) into which the received variable value should be stored (process P32C). At this time, the address is identified using a calculation method corresponding to a data structure currently stored in the memory. Then, the processor 100 performs a compatibility check (process P33C). This compatibility check is also performed using a calculation method corresponding to the data structure currently stored in the memory. The processor 100 further writes the updated value into a designated address on the memory (process P34C). At this time, the processor 100 writes data into the memory in accordance with a data structure corresponding to the data structure currently stored in the memory. That is to say, a data structure is converted.

When the external device requests data (a variable value) of a network variable, the processor 100 of the processing unit 10 reads the data (variable value) stored in the memory (process P41C), and appends a check bit to a CRC of the read data and the like (process P42C). In reading the data (variable value), conversion to the data structure handled by the PLC 1 is performed. This error check is also performed using a calculation method corresponding to the data structure currently stored in the memory. Then, the processor 100 identifies a transmission destination of the requested data (variable value) (process P43), and transmits the variable value (process P44).

As described above, the executable program executed on the PLC 1 includes an instruction for, in response to an output request for data stored in the memory of the PLC 1, converting the data into a data structure of the PLC 1 corresponding to a designated data type and outputting the converted data.

<H. Processing for Generating Executable Program>

The following describes processing for generating an executable program executed on the processing unit 10 (the processor 100) of the PLC 1. As described above, the support device 200 generates the executable program.

(h1: Functional Configuration)

Figure 11:
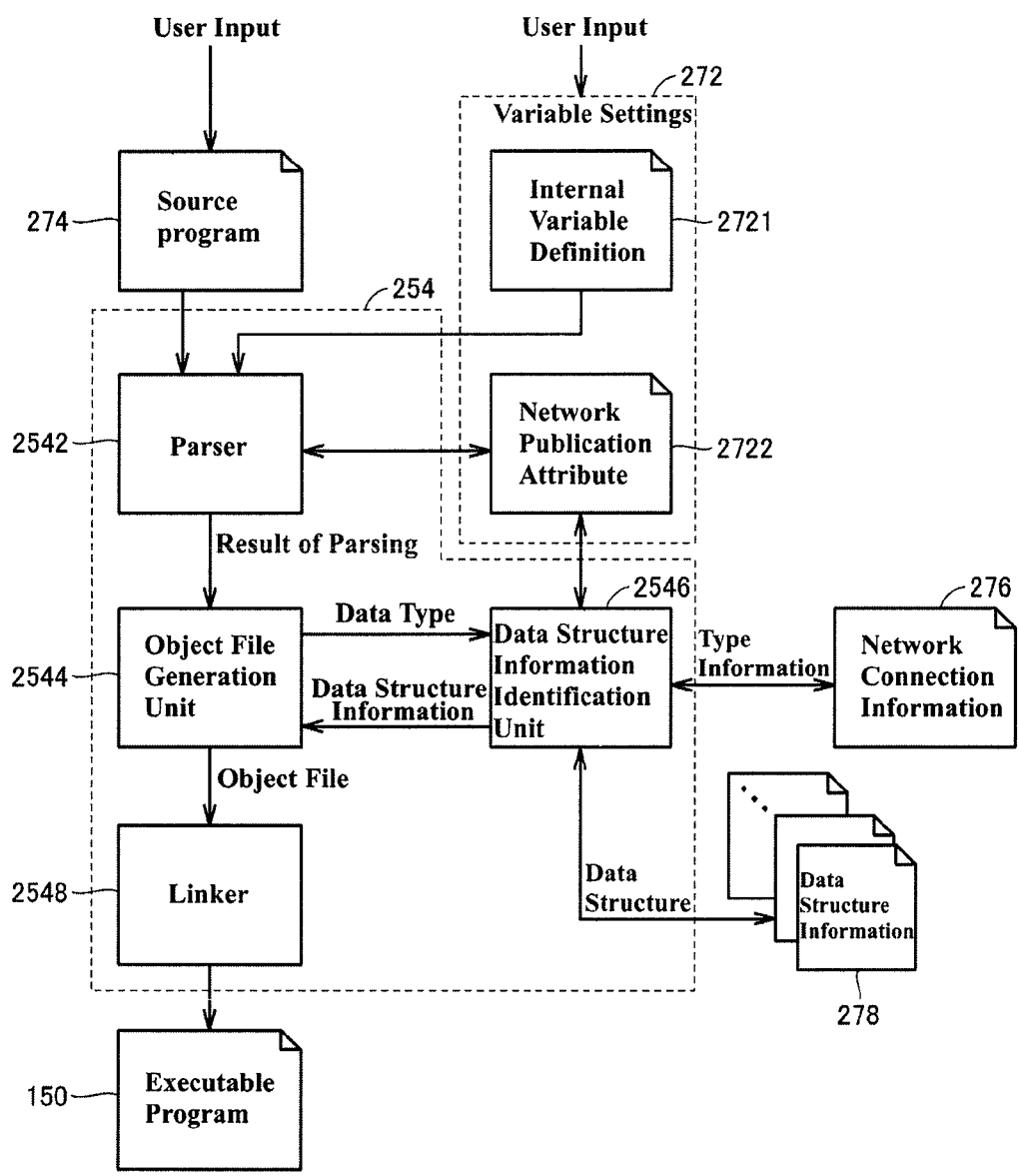
FIG. 11 is a diagram for illustrating processing for generating the executable program by the support device according to the present embodiment.

FIG. 11 is a diagram for illustrating processing for generating the executable program by the support device 200 according to the present embodiment. Functional blocks shown in FIG. 11 are realized mainly by the CPU 201 of the support device 200 executing the programming application 250. The compiler 254 constituting the programming application 250 includes a parser 2542, an object file generation unit 2544, a data structure identification unit 2546, and a linker 2548 as functional modules thereof.

Referring to FIG. 11, the parser 2542 of the compiler 254 receives the source program 274 as well as the variable settings 272 including an internal variable definition 2721 and a network publication attribute 2722, and performs parsing. It will be assumed that the source program 274 has been expressed using (internal) variables for which processing executed on the PLC 1 is defined. The internal variable definition 2721 is information defining (internal) variables for data handled by the PLC 1 on a data-by-data basis. The network publication attribute 2722 includes information (for example, an IP address and the like) that identifies a type of a PLC of the other communication party in association with the internal variables.

The parser 2542 outputs the result of parsing to the object file generation unit 2544. The object file generation unit 2544 outputs an object file, which is an intermediate native code for generating the executable program. As described above, the PLC 1 maintains data (a variable value) related to a variable exchanged between PLCs in a data structure corresponding to a data structure handled by a PLC of the other communication party. Therefore, when generating an object file pertaining to each variable, the object file generation unit 2544 adapts a corresponding data structure based on information indicating whether or not the variable is a network variable, and on information of a data structure of a PLC involved in the exchange.

More specifically, based on the result of parsing from the parser 2542, the object file generation unit 2544 extracts, from among variables defined by the internal variable definition 2721, variables to which a network publication attribute is set. For internal variables to which the network publication attribute is not set, the object file generation unit 2544 generates an object file such that a normal data structure is maintained. That is to say, an object file is generated so as to execute processing similar to processing for variables exchanged with the PLC 2 shown in FIG. 10 described above.

In contrast, for internal variables to which the network publication attribute is set, the object file generation unit 2544 obtains data structure information from the data structure identification unit 2546. For internal variables to which the network publication attribute is set, the object file generation unit 2544 generates an object file so as to realize an appropriate data structure. That is to say, an object file is generated so as to execute processing similar to processing for variables exchanged with the PLC 3 shown in FIG. 10 described above.

Based on a data type of internal variables to which the network publication attribute is set, the data structure identification unit 2546 identifies information of a data structure that should be set for the internal variables, and returns a value (data structure information) thereof to the object file generation unit 2544.

More specifically, the data structure identification unit 2546 obtains information of a PLC associated with target internal variables by referring to the network publication attribute 2722. Typically, this information of the PLC includes an IP address of the PLC.

Then, the data structure identification unit 2546 obtains corresponding type information of the PLC by referring to network connection information 276 based on the obtained IP address. The network connection information 276 typically expresses correspondence relationships between model information of PLCs connected to the network NW of the PLC system SYS and allocated IP addresses. It should be noted that the network connection information 276 may be set by an administrating user of the PLC system SYS, and may be dynamically generated using a known method.

The data structure identification unit 2546 further obtains data structure information corresponding to a target type by referring to data structure information 278, which is prescribed in advance for types of PLCs on a type-by-type basis, and returns a data structure corresponding to a designated data type to the object file generation unit 2544. The data structure information 278 defines a data type and a corresponding data structure for types of PLCs on a type-by-type basis.

The object file generation unit 2544 generates object files for all internal variables and necessary object files. Subsequently, the linker 2548 generates an executable program by combining these object files.

As described above, the programming application 250 executed on the support device 200 generates an executable program using information defining internal variables (that is to say, the internal variable definition 2721) and the source program 274. At this time, the programming application 250 serving as a generation unit adapts a data structure of data (variable values) secured in a memory in correspondence with variables of the PLC 1 in accordance with a type of a PLC of the other communication party.

(h2: Processing Procedure)

A description is now given of a processing procedure in which the support device 200 generates an executable program.

Figure 12:
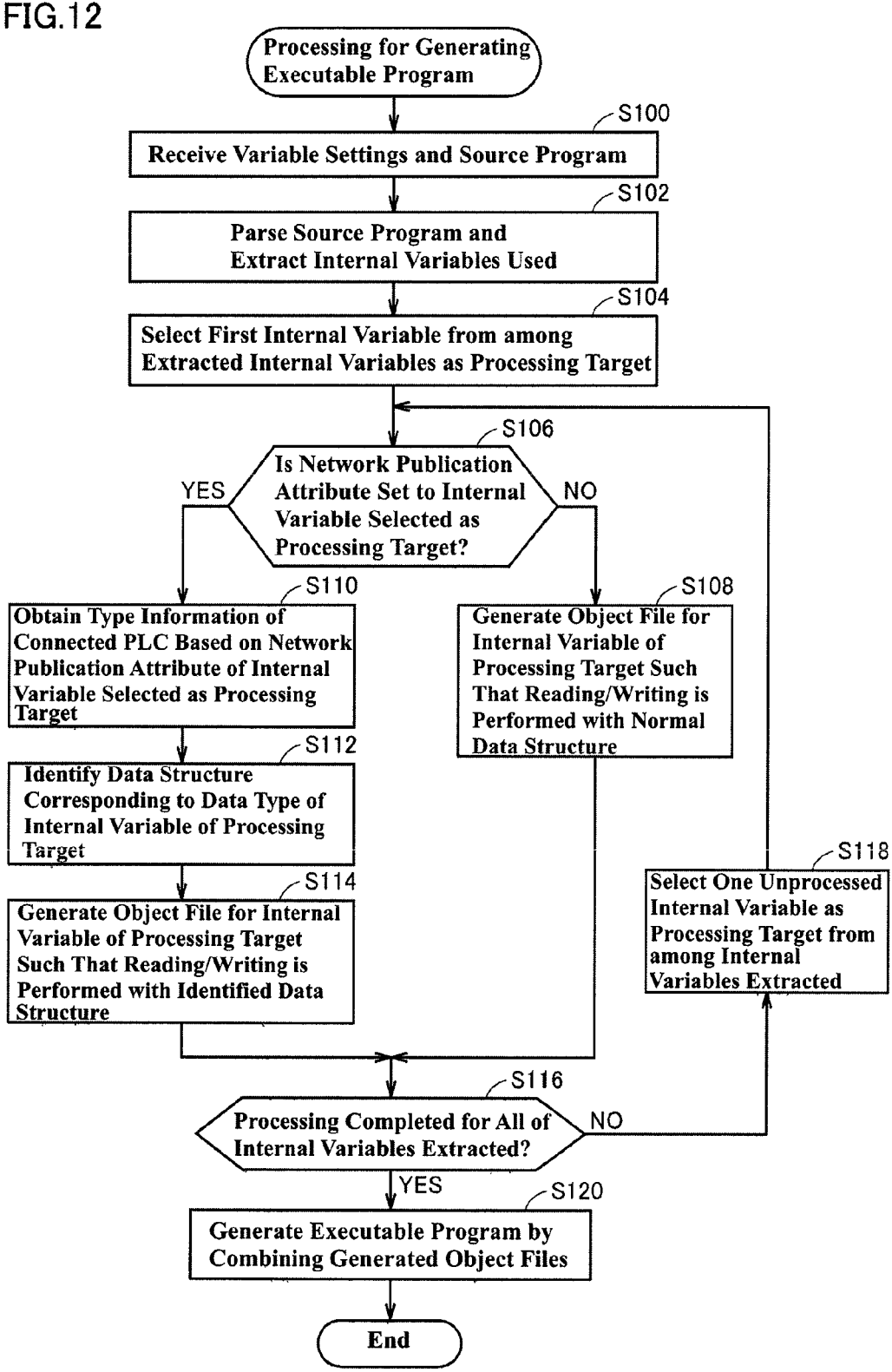
FIG. 12 is a flowchart showing a procedure of processing for generating the executable program by the support device according to the present embodiment.

FIG. 12 is a flowchart showing a procedure of processing for generating the executable program by the support device 200 according to the present embodiment. The processing procedure shown in FIG. 12 is realized by the CPU 201 of the support device 200 executing the programming application 250.

Referring to FIG. 12, the CPU 201 of the support device 200 receives the variable settings 272 and the source program 274 generated by the user (step S100). The CPU 201 parses the received source program 274 with reference to the variable settings 272, and extracts internal variables used (step S102).

Next, the CPU 201 selects the first internal variable from among the internal variables extracted in step S102 as a processing target (step S104). Then, the CPU 201 determines whether or not a network publication attribute is set to the internal variable selected as the processing target (step S106).

If the network publication attribute is not set (NO of step S106), the CPU 201 generates an object file for the internal variable of the processing target such that reading/writing is performed with a normal data structure (step S108). Then, processing proceeds to step S116.

On the other hand, if the network publication attribute is set (YES of step S106), the CPU 201 obtains type information of a PLC connected thereto based on the network publication attribute of the internal variable selected as the processing target (step S110). Subsequently, the CPU 201 obtains data structure information corresponding to the obtained type information, and further identifies a data structure of the obtained data structure information corresponding to a data type of the internal variable of the processing target (step S112). The CPU 201 generates an object file for the internal variable of the processing target such that reading/writing is performed with the identified data structure (step S114). Then, processing proceeds to step S116.

The CPU 201 determines whether or not processing has been completed for all of the internal variables extracted in step S102 (step S116). If processing has not been completed for all of the internal variables extracted in step S102 (NO of step S116), the CPU 201 selects one unprocessed internal variable from among the internal variables extracted in step S102 (step S118) and repeats processing from step S106.

On the other hand, if processing has been completed for all of the internal variables extracted in step S102 (YES of step S116), the CPU 201 generates the executable program by combining the generated object files (step S120). Then, processing is ended.

<I. Modification Examples>

While the above embodiment has illustrated a method for identifying a type of a PLC of the other communication party with which network variables are exchanged using an IP address and the like, no limitation is intended in this regard, and any method may be employed.

For example, if a model and the like of the PLC of the other communication party are already known, the type of the PLC may be directly set by the user when the user sets a network publication attribute. If this configuration is employed, the network connection information 276 shown in FIG. 11 is not necessary.

Furthermore, if a data structure corresponding to the model of the PLC of the other communication party is already known, the data structure of the PLC may be directly set by the user when the user sets a network publication attribute. If this configuration is employed, the data structure information 278 shown in FIG. 11 is not necessary.

Furthermore, while the above embodiment has illustrated a configuration for adapting data structures of variables stored in the main memory 104, data structures of variables stored in the buffer memory 146 of the network controller 140 may be adapted. In this case, variables are stored in the main memory 104 with the original data structure of the PLC 1, and data structure conversion processing (adaptation processing) is executed when data that has been received from another PLC and is primarily stored in the buffer memory 146 is transferred to the main memory 104 as corresponding variable values. Furthermore, the data structure conversion processing (adaptation processing) may be executed when data is transferred from the main memory 104 to the buffer memory 146 for transmission to another PLC.

<J. Advantage>

When data is exchanged between PLCs by designating variables, the support device 200 according to the present embodiment enables data exchange more easily via a network, even if a data structure handled by a PLC of the other communication party does not match.

The embodiment disclosed herein is to be considered in all respects as illustrative, and not restrictive. The scope of the present invention is indicated by the claims, rather than by the above description, and is intended to embrace all changes that come within the meaning and scope of equivalency of the claims.

INDEX TO THE REFERENCE NUMERALS 1, 2, 3 PLC
6 detection sensor
7 relay
10 processing unit
11 system bus
12 power source unit
13 connection cable
14 IO unit
100 processor
102 chip set
104 main memory
106 non-volatile memory
108 system timer
110 USB connector
120 system bus controller
122 DMA control circuit
124 system bus control circuit
126, 146 buffer memory
130 system bus connector
140 network controller
144 network control circuit
160 scheduler
170 user-defined application 172 input processing module
174 output processing module
176 communication processing module
178 system module
180 instruction execution module
184 memory manager
186 data structure conversion module
190 real-time OS
200 support device
201 CPU
202 ROM
203 RAM
204 hard disk (HDD)
205 keyboard
206 mouse
207 monitor
208 CD-ROM drive
240 OS
250 programming application
252, 282 editor
254 compiler
256 debugger
258 GUI module
260 simulator
270, 290 data storage unit
274 source program
276 network connection information
278 data structure information
280 network setting application
284 configurator
286 association module
296 connection settings
300 CD-ROM
2542 parser
2544 object file generation unit
2546 data structure identification unit
2548 linker
2721 internal variable definition
2722 network publication attribute
NW network
SYS system

The invention claimed is:

1. A support device for generating an executable program executed on a first programmable logic controller including a processor, a memory, and a network interface, the support device comprising:
a first input receiver configured to receive information defining variables and data types corresponding to the variables for data handled by the first programmable logic controller;
a second input receiver configured to receive a source program generated by the support device expressing processing executed on the first programmable logic controller using the defined variables and data types;
a third input receiver configured to, when a first variable indicating first data handled by the first programmable logic controller is placed in correspondence, via a network, with a second variable indicating second data handled by a second programmable logic controller connected to the first programmable logic controller via the network, receive information that identifies a type of the second programmable logic controller in association with the first variable; and
a generator configured to generate the executable program using the information defining the variables and the source program,
wherein the generator adapts a data structure of the first data secured in the memory in correspondence with the first variable in accordance with the type of the second programmable logic controller.

2. The support device according to claim 1,
wherein the information defining the variables includes information defining a data type corresponding to the variables, and
the generator generates the executable program including an instruction for storing the first data into the memory in accordance with a data structure of the second programmable logic controller corresponding to a first data type.

3. The support device according to claim 2,
wherein the executable program includes an instruction for storing the first data into the memory in such a manner that an order of elements included therein is rearranged.

4. The support device according to claim 2,
wherein the executable program includes an instruction for storing the first data into the memory with a dummy element added thereto.

5. The support device according to claim 2,
wherein the executable program includes an instruction for storing the first data into the memory with a dummy element removed therefrom.

6. The support device according to claim 2,
wherein the executable program includes an instruction for, in response to an output request for the first data stored in the memory, converting the first data into a data structure of the first programmable logic controller corresponding to the first data type and outputting the converted first data.

7. A non-transitory recording medium having recorded therein a support program for generating an executable program executed on a first programmable logic controller including a processor, a memory, and a network interface, the support program comprising:
a first input instruction for receiving information defining variables and data types corresponding to the variables for data handled by the first programmable logic controller;
a second input instruction for receiving a source program generated by the support device expressing processing executed on the first programmable logic controller using the defined variables and data types;
a third input instruction for, when a first variable indicating first data handled by the first programmable logic controller is placed in correspondence, via a network, with a second variable indicating second data handled by a second programmable logic controller connected to the first programmable logic controller via the network, receiving information that identifies a type of the second programmable logic controller in association with the first variable; and
a generation instruction for generating the executable program using the information defining the variables and the source program,
wherein the generation instruction includes an instruction for adapting a data structure of the first data secured in the memory in correspondence with the first variable in accordance with the type of the second programmable logic controller.

8. A method for generating an executable program executed on a first programmable logic controller including a processor, a memory, and a network interface using a support device, the method comprising:

receiving information defining variables and data types corresponding to the variables for data handled by the first programmable logic controller;

receiving a source program generated by the support device expressing processing executed on the first programmable logic controller using the defined variables and data types;

when a first variable indicating first data handled by the first programmable logic controller is placed in correspondence, via a network, with a second variable indicating second data handled by a second programmable logic controller connected to the first programmable logic controller via the network, receiving information that identifies a type of the second programmable logic controller in association with the first variable; and generating the executable program using the information defining the variables and the source program, wherein the generating includes adapting a data structure of the first data secured in the memory in correspondence with the first variable in accordance with the type of the second programmable logic controller.

* * * * *